United States Patent [19]
Parker

[11] 3,822,594
[45] July 9, 1974

[54] ELECTROTHERMAL ANALOG TEMPERATURE INDICATING DEVICE

[76] Inventor: Robert Parker, 394 Harper Ln., Danville, Calif. 94526

[22] Filed: Jan. 12, 1973

[21] Appl. No.: 323,182

[52] U.S. Cl. .................................................. 73/356
[51] Int. Cl. ............................................. G01k 11/12
[58] Field of Search ........ 73/356, 339; 350/160 LC; 340/228 R

[56] References Cited
UNITED STATES PATENTS
3,524,726  8/1970  Koster.................................. 73/356
3,529,156  9/1970  Fergason et al. ............. 350/160 LC
3,700,603  10/1972  Rembaum............................. 73/356

Primary Examiner—Donald O. Woodiel

[57] ABSTRACT

An electrothermal analog temperature indicating device is provided having an electrical heating resistance element with means for electrical connection to a heating appliance, a liquid crystal composition thermally responsive to said heating element to indicate at least one temperature of said heating appliance and means for insulating said device to provide a cooling response of said liquid crystal composition analogous to the cooling response of said heating appliance, when electrical energy is no longer being supplied to said heating element.

12 Claims, 5 Drawing Figures

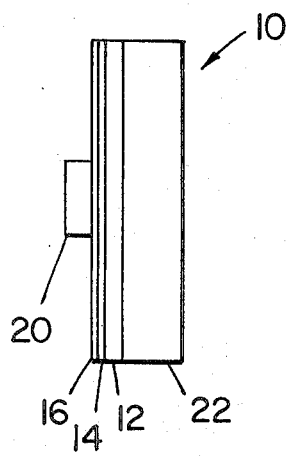
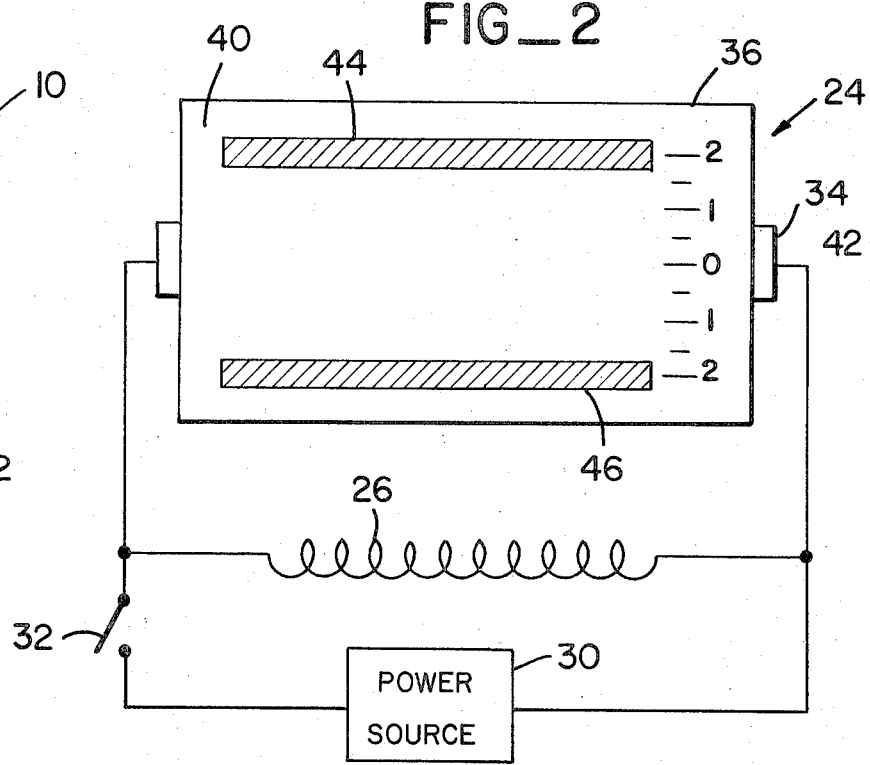
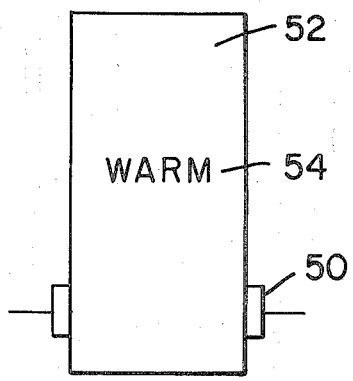
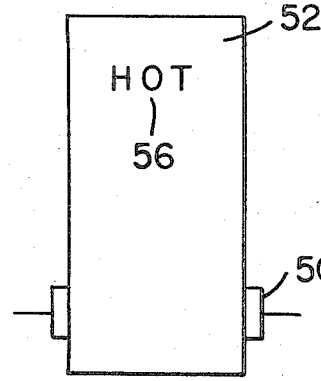
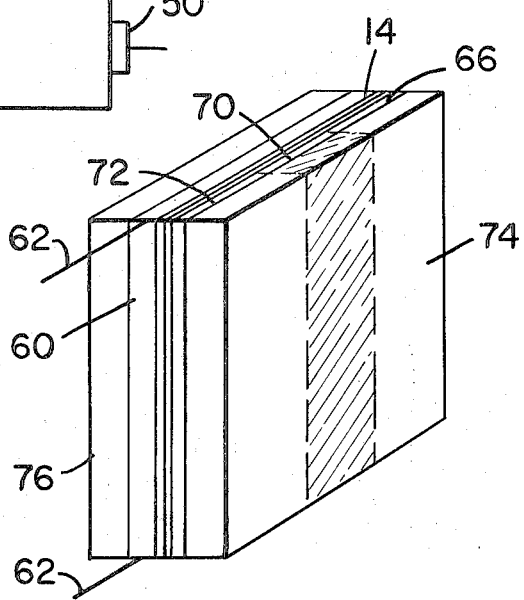

ELECTROTHERMAL ANALOG TEMPERATURE INDICATING DEVICE

BACKGROUND OF THE INVENTION

1. Field of the Invention

Electrical appliances are hazardous, because there is no visual indication at temperatures which will burn the skin. Thus, because the rate of cooling of many appliances may take one or more minutes, there is normally a period of time where the heating appliance is potentially hazardous. This is particularly true of electrical ranges, which while on will frequently appear red, but when turned off, rapidly lose the red color, but retain high temperatures for relatively long periods of time.

There are many ways to measure the temperature of the heating appliance and provide a warning to the user. For example, thermometers can be employed, but these are expensive, and the use of mercury adjacent to a heating element highly hazardous. While a thermocouple could be employed, the thermocouple is prohibitively expensive, since relatively expensive circuitry must be employed with the thermocouple.

Therefore, it is highly desirable to have a stable, safe inexpensive means for providing some indication of the temperature of the heating appliance, which can serve as a warning when the appliance is at a temperature which will burn the skin. The apparatus must be responsive to the heating appliance, when the heating appliance is on as well as off. In addition, it is frequently desirable that the indicator not only provide a warning as to when a temperature has been reached which is hazardous to the skin, but also some indication when higher temperatures have been reached and the appliance is at a temperature for use.

2. Description of the Prior Art

Liquid crystal compositions are well known. The use of temperature responsive liquid crystal compositions for thermometric purposes may be found in British Patent No. 1,138,590, U.S. Pat. No. 3,440,882 and copending U.S. application Ser. No. 263,064 filed June 15, 1972. See also application Ser. No. 290,199, filed Sept. 18, 1972.

SUMMARY OF THE INVENTION

An electrothermal analog temperature indicating device is provided having a current or voltage responsive heating element with means for connecting to a heating appliance, at least one liquid crystal composition in heat exchanging relationship with said heating element, and insulating means for relating the cooling response of said liquid crystal composition to the cooling response of said heating appliance. The lower transition temperature of the liquid crystal composition will be above the normal ambient temperatures which would be expected to be encountered, and usually substantially below the temperatures achieved by the heating appliance.

BRIEF DESCRIPTION OF THE DRAWINGS

FIG. 1 is an elevational cross-sectional view of an electrothermal analog temperature indicating device;

FIG. 2 is a diagrammatic view of a circuit employing the subject device;

FIGS. 3 and 4 are plan views of a second embodiment of the second invention; and FIG. 5 is a perspective view of a temperature indicator having a plurality of liquid crystal compositions.

DESCRIPTION OF THE SPECIFIC EMBODIMENTS

Temperature indicators are provided which are safe, stable, and inexpensive, and can be adapted for qualitative to substantially quantitative determinations of the temperature of a heating appliance, which respond proportionately or in relationship to temperature changes in the electrical heating appliance.

The device has three distinct characteristics: an electrical heating means, which has a thermal response in proportion to the current or voltage applied to the heating appliance; a liquid crystal composition or compositions, in heat exchanging relationship with said heating means, having a lower transition temperature, usually both transition temperatures, in the range of temperatures developed by said heating means; and a heat sink including the above elements, which is in heat exchanging relationship with the ambience or environment, providing a cooling response of the device proportional to the cooling response of the heating appliance.

A wide variety of heating elements can be employed and placed in substantially direct or indirect contact with a film of one or more liquid crystal compositions. The liquid crystal composition can then be coated, covered, encased or enclosed in an inert, at least partially transparent, protective coating, sheet or encasing which will serve as the major portion of the heat sink. Means for electrically connecting the heating element, either in series or parallel, to the circuit of the heating appliance are provided.

In preparing the temperature indicator, a liquid crystal composition containing member is fabricated. Conveniently, a plastic sheet, preferably polyethylene terephthalate (Mylar) is employed as a base or cover. The plastic sheet may be masked with a black ink or paint, leaving transparent areas in the shape of symbols, numbers, scales or the like. The transparent areas are then coated with one or more liquid crystal compositions, depending on the manner in which the heat exchanging relationship of the member with the heating means is achieved, and the temperature ranges of interest. The one or more liquid crystal compositions are then allowed to dry. In order to enhance the visibility of the liquid crystal composition, a black backing for the liquid composition is provided, which may take a variety of different forms. Conveniently, the liquid crystal compositions may be coated with a black film, usually an ink or paint to complete the liquid crystal composition containing members.

The plastic sheet will normally have a thickness in the range of about 1 to 20 mils, while the liquid crystal composition will be coated in thicknesses of from about 2 to 10 mils. The black backing will be sufficient to provide an opaque backing, varying from a fraction of a mil e.g. 0.5 mil, to a few mils, e.g. 5 mils.

A heating element is provided in heat exchanging relationship to the liquid crystal composition. The heating element will have wires for connection to the circuit of the appliance. The heating element will normally be placed opposite the viewing surface of the liquid crystal composition.

The heating element can be in substantially direct or indirect contact with the liquid crystal composition. In one embodiment, the heating element will be in direct contact with the liquid crystal composition or the thin black backing. In another embodiment, a sheet or plate of a poor or relatively poor heat conductor can be employed, where the heating element has a small surface area compared to the heat conductor. In this manner a gradient is achieved across the heat conductor, with the temperature of the heat conductor diminishing with distance from the heat source.

By having a layer or stripe of liquid crystal composition in heat exchanging relationship with the heat conductor and extending away from the heat source, the distance at which the liquid crystal composition undergoes its transition to become visible will be proportional to the temperature of the heat source.

The resulting assembly may then be encased in a suitable potting compound, which is transparent and will normally provide some ultraviolet protection for the liquid crystal compositions. Alternatively, a protective film of glass or plastic may be applied to the plastic sheet. In another variation, the plastic sheet may be dispensed with, and any masking applied to the protective insulating film and the liquid crystal composition coated directly on the protective film.

The protective film not only acts to protect the liquid crystal composition, but also acts as a heat sink or thermal inertial element to provide a heat exchanging relationship with the ambient in relation to the heat exchanging relationship of the heating appliance with the ambient. Therefore, the heat sink responds both to the heating element and to the ambient environment in a related manner to the heating appliance. A wide variety of insulating materials which provide the necessary transparency can be employed in heat exchanging relationship with the liquid crystal composition.

Alternatively the heating element can be desigend to have a heat response analogous to that of the heating appliance and a sufficiently high heat capacity, as compared to the heat capacity of the remainder of the temperature indicator, so as to maintain the liquid crystal composition substantially at the temperature of the heating element.

In this regard, during the heating cycle, the temperature of the liquid crystal composition will be primarily controlled by the heating element. The insulation will allow for a substantially direct relationship between the temperature of the heating element and the temperature of the liquid crystal composition. Also, since the liquid crystal composition will be at a temperature below 200° F, the temperature differential between, on the one hand, the liquid crystal composition and insulation, and, on the other hand, the the ambient will be relatively small. Therefore, the response of the liquid crystal composition to the heating element will be direct and prompt.

In the cooling cycle, the temperature of the liquid crystal composition will be a function of the temperature of the heat sink, usually primarily the insulation. Normally, the thermal gradient across the insulation will be substantially less than the temperature drop at the surface of the insulation in contact with the ambient. As a reasonable approximation, one can assume the liquid crystal composition will be within a few degrees of the temperature of the insulator surface. Therefore, the rate of cooling of the insulator surface can be considered to be approximately equal to the rate of cooling of the liquid crystal composition. By choosing an appropriate insulating material of appropriate size and geometry one can readily determine empirically its rate of temperature decay from a particular temperature. From this determination, one can relate the size and geometry of the insulation to have a temperature decay profile which relates to the rate of cooling of the heating appliance.

It should also be noted that in most instances while there will be substantial interest in the temperature of the heating appliance during the heating cycle, the primary interest during the cooling cycle will be whether the appliance is safe. Therefore, in many situations, the temperature indicating device can be designed to indicate semi-quantitatively or quantitatively the temperature during the heating cycle, but primarily act as a warning device during the cooling cycle. The insulator would then serve to hold a portion of the liquid crystal composition indicator above the compositions lower transition temperature until the appliance would have cooled to a safe temperature.

To further understand the subject invention, the drawings will now be considered.

In FIG. 1 a cross-sectional view of a temperature indicator 10 is depicted. A thin Mylar film 12 is masked, so as to leave transparent areas having appropriate symbols. The Mylar film is then coated over the transparent areas with a thin coating of a liquid crystal composition 14. In order for the liquid crystal compositions to be seen clearly, when the compositions go from the transparent state to the visible and colored state, a dark backing, 16 is employed which can conveniently be a black ink or paint. Depending on the nature of the backing and its heat transfer properties an additional sheet of a poor heat conductor can be provided for heat exchange between the liquid crystal composition and the heating element.

A heating element 20 is then applied or affixed to the backing or heat transfer sheet, so as to be in heat exchanging relationship with the liquid crystal composition. The choice of heating element as well as the positioning of the heating element can be varied widely depending on the manner in which the heat exchanging relationship is desired, the type of connection to the heating appliance circuit, the type of current or voltage heat relationship which is required, and the like.

The variation in response of the liquid crystal composition to the heat source or heating element 20 can be achieved in a number of ways. One simple way is to use a variety of liquid crystal compositions having different transition temperature ranges, and have them in equivalent heat exchanging relationship with the heat source. In this manner, the response will be based on the heat soure providing a temperature at least equal to the minimum temperature of the liquid crystal composition. One can then provide liquid crystal compositions with overlapping temperature ranges, so that as one liquid crystal composition reaches its upper transition temperature, the lower transition temperature of the next liquid crystal composition will be achieved. In this manner, once the transition temperature of the liquid crystal composition having the lowest transition temperature has been achieved, there will be a continual gradation along the path of liquid crystal composition as the temperature rises with successive liquid crystal compositions passing through their transition temperatures.

An alternative method is to use a single liquid crystal composition and a zone heat source, in contact with a heat conductor which provides a temperature gradient.

In this embodiment the heat conductor is in heat exchanging relationship with the environment, so that there is a temperature gradient across the liquid crystal composition. The temperature is highest nearest the heating element and coolest farthest away from the heating element. Therefore, as the temperature of the heat source rises, the lower transition temperature of the liquid crystal composition will be achieved farther and farther away from the heat source.

A protective coating, sheet or casing 22 is now applied to provide additional protection to the liquid crystal composition, make the temperature indicator of a convenient size for handling, and also, provide insulation as a heat sink or thermal or inertial element which serves to control the thermal response of the liquid crystal compositions, during the cooling cycles. The insulation may overlie the liquid crystal composition element or completely enclose the device.

The heat sink will normally have the greatest heat capacity of the various elements of the indicator and will be in heat exchanging relationship with the heating element and the ambient, so as to absorb heat from the heating element, when the heating element is on, and cool the device by exchange with the ambient heating environment, both during the heating cycle and the cooling cycle. The effect of the insulator on the temperature of the liquid crystal during the heating cycle will be small compared to the effect of the heating element.

The layer in close juxtaposition to the heating element will respond relatively rapidly to the temperature of the heating element, when the heating element is on. When the heating element is off, the rate of cooling will depend on the thermal inertia of the insulator and the temperature differential between the insulator and ambient.

The heat source can be a wide variety of different elements. Conveniently, the heat source can be a resistance heater sheet, film or foil. One type of heating element is sold as Temsheet, which is a carbon impregnated paper. Alternatively, thin metal foils can be employed of the desired resistivity. Resistance wires can be employed to provide a line source of heat, particularly where a temperature gradient is desired across the liquid crystal composition. Other types of heaters may also be employed with advantage. For the most part, the heater will be a high resistivity heater with low heat capacity. The temperature of the heating element will parallel the temperature of the heating appliance, but at a much lower temperature than the heating appliance, and normally over a much smaller temperature range. Usually the heater will provide temperatures below 400° F, usually below 300° F.

The liquid crystal compositions which are employed will normally have minimum transition temperatures of at least 100°F, usually at least 105°F, normally not exceeding 200°F, and more usually in the range of about 105° to 170°F. Microencapsulated liquid crystal compositions can be employed, and are preferred, although microencapsulated compositions need not be employed. The liquid crystal compositions are primarily cholesteryl esters and are well-known in the art.

The liquid crystal compositions can be prepared so as to have narrow or relatively wide transition temperature ranges, as desired. For use in the subject invention, the extent of the transition temperature range will vary depending on the manner in which the liquid crystal composition is employed. Normally, relatively wide ranges will be employed, particularly where the temperature indicator is employed as a warning device. In this manner, the warning symbol will be retained over a relatively wide temperature range of the heating appliance. Where a semi-quantitative or quantitative determination of the temperature of the heating appliance is desired, the liquid crystal composition will normally have relatively narrow ranges for their transition temperature range.

The transition temperature range intends the range of temperature through which the liquid crystal composition polarizes and scatters light. Therefore, in this temperature range, the liquid crystal composition is visible.

The insulating layer can be a flat sheet or a sheet of varying thickness depending on the heating element, the nature of the liquid crystal composition or compositions, and the desired ambient thermal response. Usually, the sheet will be of from 1/16 to ¼ inch in thickness. The insulation is conveniently a plastic or polymeric sheet, at least a portion of which is transparent. Useful plastic materials include polymethacrylates, polycarbonates, polypropylene, polyvinylchloride, etc.

In FIG. 2 is depicted a temperature indicator in series with a load or appliance element. The temperature indicator 24 is connected in parallel with the load 26, with the current being derived from a home source of voltage 30 supplying 110 or 220 volts. A switch 32 is provided for turning the load 26 on and off. The switch is shown in the open position and when closed, current will flow so as to heat the load and also heat the heating element 34 of the temperature indicator 24.

A reticle 36 is printed on the undersurface of the top protective sheet 40. As the heating element 34 heats the liquid crystal composition, the lower transition temperature of the liquid crystal composition will be reached and the liquid crystal composition will be visible.

The temperature indicating device 24 has a zone close to the heating element which will reach its lower transition temperature initially. The protective sheet 40 will be under a temperature gradient, with the highest temperature at the longitudinal center indicated by the zero 42 of the scale. As the temperature rises, the liquid crystal composition nearest the heating element 34 will go through its maximum transition temperature and become transparent, while liquid crystal composition removed from the center will undergo its lower transition temperature and become visible.

The liquid crystal composition will appear as two long bars 44 and 46, which will move farther and farther from the center of the temperature indicator as the temperature of the heating element increases. The space between the bars, will therefore be an indications of the temperature of the heating appliance. The greater the voltage applied to the heating appliance, the greater will be the voltage applied to the heating element 34 and the higher the temperature achieved at the longitudinal center 42 of the temperature indicator 24.

By adjusting the amount of heat obtained from the heating element 34 and the heat exchange relationship between the liquid crystal composition, the protective sheet 40 and the environment, the spacing between the bars 44 and 46 can be a semi-quantitative or quantitative determination of the appliance temperature. When the switch 32 is open, the current will be shut off, and the heating element 34 and the protective sheet 40 will begin to cool. Normally, the heating element will rapidly cool, so as not to have a significant effect on the rate of cooling of the liquid crystal composition.

In FIGS. 3 and 4 a device is depicted whose thermal response relies on a temperature gradient across a poor heat conductor, with which the liquid crystal composition(s) is in heat exchanging relationship. The heating element 50 has wires which are connected to a circuit not shown. When the heating appliance or load is turned on, the heating element 50 warms up, warming the liquid crystal composition and the protective sheet 52, which is a poor heat conductor, e.g., plastic. For opaque materials, e.g., ceramic, the liquid crystal composition could be printed on the ceramic and protected with a thin transparent plastic film, e.g., polyethylene terephthalate.

As the heat is conducted away from the heating element 50 and along the liquid crystal composition and the protective sheet 52, the lower transition temperature for the liquid crystal composition will be achieved and the letters "warm" 54 will become visible. At this stage, the heating appliance or load will have achieved a certain temperature at which temperature a warning is to be indicated.

As the heating appliance or load is further heated, the heating element 50 will continue to heat the liquid crystal composition and protective sheet so that the transition temperature of the liquid crystal composition at the position of the letters "warm" 54 will undergo its upper transition temperature and become transparent. The letters "warm" 54 will then disappear. At some temperature, which can be controlled by the geometry of the temperature indicator, the thickness and nature of the insulating layer, or protective sheet, and the choice of liquid crystal composition, the temperature with the letters "hot" 56 will reach the minimum transition temperature of the liquid crystal composition. By appropriate choice of transition temperature range of the liquid crystal composition and the nature of the heating element 50 and protective sheet 52, the letters "hot" can be retained up to the maximum temperature of the heating appliance or load.

Once the heating appliance or load is turned off, the heating element 50 will also be turned off, and the temperature indicator will begin to cool. The reverse of the heating cycle will now occur. The liquid crystal composition behind the letters "hot" 56 will cool to below its lower transition temperature and the liquid crystal composition behind the letters "warm" 54 will be at a temperature below the upper transition temperature and become visible. With continued cooling, the liquid crystal composition at the letters "warm" 54 will pass through the lower transition temperature and become transparent, so that the letters "warm" 54 will no longer be visible. As already indicated, the temperatre indicator can be fabricated in such a way as to reasonably simulate the same cooling response as the load or appliance.

In FIG. 5, a temperature indicator assembly is indicated, where a heating element sheet 60 having leads 62 is indicated. The heating element 60 is affixed to a dark backing 64, which is conveniently a thermally stable paint, or ink. Coated onto the black backing are three bars 66, 70 and 72 of different liquid crystal compositions having different transition temperature ranges. The arrangement is such, that there is a small overlap between the transition temperature ranges, so that as one liquid crystal composition approaches its upper transition temperature, the adjacent liquid crystal composition has achieved its lower transition temperature. The liquid crystal compositions 66-72 are protected by an overlying insulating sheet of glass or plastic 74 and the heating element protected and insulated by a glass or plastic sheet 76 of the same material. The edge of the element may be coated with a bonding resin to completely enclose the device and firmly hold the elements of the device together.

This temperature indicator device is heated evenly across the entire liquid crystal composition. Thus, all the liquid crystal compositions are at the same temperature at the same time. As the temperature rises, the liquid crystal composition having the lowest transition temperature will become visible. As the temperature increases, the liquid crystal composition having the lowest transition temperature will pass through its upper transition temperature and become transparent, while the next liquid crystal composition becomes visible. In FIG. 5 the middle liquid crystal composition 70 is visible, indicating that the appliance is at an intermediate temperature. As the temperature goes up, the third liquid crystal composition will become visible, as the intermediate liquid crystal composition becomes transparent. Obviously, two, three or more stripes, lines, rings or the like could be employed and analogous results achieved.

A device for use with a 110 volt electrical cooking heater was fabricated as follows. Two ⅛ inch thick Lucite strips, 7 inches long and about ½ inch wide were used for insulation. Temsheet, graphite impregnated paper, having a resistance of 460 ohms/square was secured to one side of one of the Lucite sheets. Appropriate leads extended from the Temsheet for connection in parallel with a Calrod heater. Over the Temsheet was placed a strip of the liquid crystal composition member comprising, a dark polymeric paint backing, which was placed in contact with the Temsheet, the liquid crystal composition coated on the backing and a thin Mylar film covering the liquid crystal composition and bonded to the black backing. The remaining Lucite sheet was placed over the liquid crystal composition strip to complete the package and the edge of the strip sealed with a sealing compound, having the electrical leads exposed.

Two different liquid crystal composition strips were employed. For indicating the appliance as hot, with a qualitative indication of temperature, a liquid crystal composition having a visible range of 105° to 130° F was used. When a distinction was desired between warm, which would be at the threshold of cooking temperature and a warning against touching, and hot which would be a cooking temperature, two different liquid crystal compositions were employed, as small stripes. One liquid crystal composition had a visible range of 105°–125° F, while the other liquid crystal composition had a visible range of 120°–150°F.

It was found that both devices were operative in warning when the appliance was hot and gave a qualitative or semi-quantitative temperature reading, in accordance with the variations in color of the liquid crystal composition. A color standard can be provided for comparison to indicate the approximate temperature of the heating appliance.

In determining the desired characteristics of the various elements, the following equations can be employed:

A Temsheet having a resistance R of 460 ohms/sq and ¼ × 12 inches will be chosen. The power P involved will be determined by the equation $$P = V^2/R = (110)^2/(460/48) = 0.55 \text{ watts}$$

where V is voltage.

Since one watt-hour equals 3.41 BTU, there will be 1.58 BTU/hr evolved.

The temperature differential between a surface and the ambient is determined by the equation $$(T_2 - T_o) = Q \text{ in}/hA$$

where:

$T_2$ — temperature of material surface
$T_o$ — Ambient temperature
$h$ — constant (~3 BTU/ft² for free convection)
$A$ — surface area (3 inches, doubled for both sides)

$Q_{in}$ — heat introduced.

The values are inserted as follows:

$$(T_2 - T_o) \pm {}^{1.58}/(3/144) (6) = 12.5°F \,\Delta T$$

Varying the area, which can be accomplished by varying the length L while maintaining the width W constant, varies the $\Delta T$. The following equation defines the relationship of $\Delta T$ to length L:

$$(T_2 - T_o) = \Delta T = V^2/hRL^2$$

To triple the $\Delta T$, the length would be reduced to 7 inches. Assuming an ambient temperature $T_o$ of 70°F, the surface temperature would be 108°F.

Where an insulator is between the heater and the ambient, $T_1$ is the temperature of the insulator surface in contact with the heater. The following equation can be used for determination of $T_2 - T_1$:

$$(T_2 - T_1) = Q \Delta \chi / A$$

where $\chi$ = thickness (⅛ inch)
$A$ = ¼ × 7 inches
= .1 − .2 BTU/hr-ft °F for plastics $T_2 - T_1$ is found to be equal to 10°F. with a 1/16 inch thickness, $T_2 - T_1 = 5°F$.

$T_1$ will closely approximate the temperature of the liquid crystal composition. Thus, variation in the resistance of the heater, and dimensions of the insulation, can be used to control the temperature of the liquid crystal composition for any voltage.

Turning now to a consideration of the transient condition. For purposes of simplifying the calculation, it will be assumed that there is no temperature gradient in the insulator, since the difference $T_2 - T_1$ is relatively small compared to $T_2 - T_o$.

The equation governing cooling is:

$$T - T_o/T_i - T_o = e - (h (A) (\rho c V) \tau$$

where $T$ = temperature at time $t$
$T_i$ = initial temperature
$C_p$ = specific heat
$A$ = area
$\rho$ = density $\tau$ = time
$V$ = volume, where = thickness.

Taking a thickness of ⅛ inch, with $\rho \sim 1.2$, $C_p \sim .2$ BTU/°F, $\tau$ as 1, and the other symbols as the values previously indicated, a 32 percent decrease will require about 6 minutes.

This calculation demonstrates the sensitivity of the device to the dimensions of the insulator. Peak survival temperatures for the liquid crystal compositions are balanced against rapid response and appropriate cooling or temperature decay rates.

The subject invention provides a particularly convenient, safe and effective apparatus for being employed for a wide range of heating appliances, such as electric ranges, electric heaters, or other electrical apparatuses, where temperatures are of interest or concern, and provides a visible warning or indication of the temperature of the appliance or load. The temperature indicator has a thermal response to voltage or current proportional to the temperature of the load or appliance during the heating cycle and a heat exchange relationship with the ambient, which is proportionate to the cooling of the load or appliance, during the cooling cycle. This is readily achieved by varying the design of the temperature indicator, the heating element, and the choice of materials employed in fabricating the temperature indicator.

Although the foregoing invention has been described in some detail by way of illustration and example for purposes of clarity of understanding, it will be obvious that certain changes and modifications may be practiced within the scope of the invention, as limited only to the scope of the appended claims.

What is claimed is:

1. An electrothermal analog temperature indicating device for indicating the temperature of an electrical heating appliance comprising:
   a layer of at least one liquid crystal composition;
   in heat exchanging relationship with said layer, a resistance heater having a temperature response proportional to the current or voltage applied to said heating appliance;
   means for connecting said resistance heater to the circuit for said electrical heating appliance; and
   an at least partially transparent insulating overlay over said layer of a heat capacity, size and geometry to relate to the cooling of said appliance, wherein said liquid crystal composition has a responsive range in the range of temperatures produced by said resistance heater.

2. A temperature indicating device according to claim 1, wherein said layer and resistance heater are substantially enclosed together in an insulating casing.

3. A temperature indicating device according to claim 1, wherein said resistance heater is a sheet resistance heater.

4. A temperature indicating device according to claim 3, wherein said layer of said liquid crystal composition overlies said sheet resistance heater.

5. A temperature indicating device according to claim 1, wherein said resistance heater is in close juxtaposition to and overlies a portion of said layer of said liquid crystal composition, and said layer extends away from said resistance heater.

6. A temperature indicating device according to claim 1, wherein said resistance heater is a sheet resistance heater and having at least two layers of different liquid crystal compositions in the same plane, overlying said resistance heater.

7. An electrothermal analog temperature indicating device for indicating the temperature of an electrical heating appliance comprising:
   a layer of at least one liquid crystal composition, between a black backing and at least in part transparent film;
   a sheet resistance heater in juxtaposition to said black backing having a temperature response proportional to the voltage or current applied to said electrical heating appliance;
   means for connecting said resistance heater to the circuit for said electrical heating appliance; and
   an at least in part transparent insulating casing permitting the viewing of at least a portion of said layer and wherein said insulating casing is of a heat capacity, size and geometry, so as to relate the cooling of said device to the cooling of said appliance, wherein said liquid crystal composition has a responsive range in the range of temperatures produced by said resistance heater.

8. A temperature indicating device according to claim 7, including means for connecting to a circuit of a heating appliance operably connected to said heater.

9. A temperature indicating device according to claim 8, wherein said insulating casing is plastic of about 1/16 to 1/4 inch in thickness.

10. A temperature indicator according to claim 7, wherein said resistance heater is a sheet of paper impregnated with graphite.

11. An electrical thermal analog temperature indicating device for indicating the temperature of an electrical heating appliance, comprising: an elongated layer of a liquid crystal composition, between a black backing and an at least in part transparent film;
    a resistance heater centrally located in relationship to said elongated layer, having a temperature response proportional to the voltage or current applied to said electrical heating appliance;
    means for connecting said resistance heater to the circuit for said electrical heating appliance; and
    an at least in part transparent insulating casing of a heat capacity, size and geometry to relate the cooling of said device to the cooling of said appliance, wherein said liquid crystal composition has a responsive range in the range of temperature produced by said resistance heater.

12. A temperature indicating device according to claim 11, wherein said layer of liquid crystal composition is separated from said heater by a sheet of a poor thermal conductor which extends the full length of said layer.

* * * * *